United States Patent [19]

Chiba et al.

[11] Patent Number: 5,239,881
[45] Date of Patent: Aug. 31, 1993

[54] VARIABLE SPEED GEARED MOTOR AND A SERIES THEREOF

[75] Inventors: Yoshikazu Chiba, Ohbu; Masayuki Tanigawa, Kariya; Masanori Egawa, Chiryu; Kiyoji Minegishi, Chita, all of Japan

[73] Assignee: Sumitomo Heavy Industries, Ltd., Tokyo, Japan

[21] Appl. No.: 885,694

[22] Filed: May 19, 1992

[30] Foreign Application Priority Data

May 21, 1991 [JP] Japan .................................. 3-145596

[51] Int. Cl.[5] .................................................. F16H 1/12
[52] U.S. Cl. ................................... 74/421 A; 310/83
[58] Field of Search .......................... 74/421 R, 421 A; 310/83

[56] References Cited

U.S. PATENT DOCUMENTS

| | | | |
|---|---|---|---|
| 2,170,548 | 8/1939 | Christian | 310/83 |
| 2,320,379 | 6/1943 | Niekamp | 74/421 A |
| 2,503,027 | 4/1950 | Christian | 74/421 A |
| 3,153,158 | 10/1964 | Schmitter | 74/421 A X |
| 3,234,808 | 2/1966 | Nelson | 74/421 A |

FOREIGN PATENT DOCUMENTS

| | | | |
|---|---|---|---|
| 540974 | 12/1931 | Fed. Rep. of Germany | 74/421 A |
| 576436 | 3/1933 | Fed. Rep. of Germany | 74/421 A |
| 730889 | 8/1932 | France | 74/421 A |
| 60-26849 | 2/1985 | Japan . | |
| 413281 | 7/1934 | United Kingdom | 74/421 A |

*Primary Examiner*—Allan D. Herrmann
*Assistant Examiner*—David W. Laub
*Attorney, Agent, or Firm*—Nikaido, Marmelstein, Murray & Oram

[57] ABSTRACT

In a variable speed geared motor constructed by combining an inverter motor controllable in rotational speed by inverter drive with a gear reducer, the gear reducer is of a two-stage type, and a reduction ratio i of the gear reducer is suppressed so that $i \leq N$ holds where N stands for a maximum reduction ratio of the inverter motor at which a constant torque characteristic can be ensured. Further, in a series of variable speed geared motors each satisfying the above conditions, a common ratio R of a series of reduction ratios i of the variable speed geared motors is set to 1.2–1.5. For example, the series is set to 2, 3, 4, 5, 6, and 8.

Accordingly, the geared motor can be constructed lightly in weight, compactly, and at low costs, and it can be economically used in a rotational speed region of 200–900 rpm which is an ordinary region in driving of a pump or a high-speed conveyor.

2 Claims, 7 Drawing Sheets

PRIOR ART

FIG. 5 PRIOR ART

REDUCTION RATIO

| FIRST SERIES | 1.00 | 1.25 | 1.60 | 2.00 | 2.50 | 3.15 | 4.00 | 5.00 | 6.30 | 8.00 |
|---|---|---|---|---|---|---|---|---|---|---|
| SECOND SERIES | 1.12 | 1.40 | 1.80 | 2.24 | 2.80 | 3.55 | 4.50 | 5.60 | 7.10 | |

(USE OF SECOND SERIES IS NOT RECOMENDED)

FIG. 6 PRIOR ART

REDUCTION RATIO

| SECOND STAGE | FIRST SERIES | 6.3 | 8.0 | 10.0 | 12.5 | 16.0 | 20.0 | 25.0 | 31.5 | 40.0 | 50.0 |
|---|---|---|---|---|---|---|---|---|---|---|---|
| | SECOND SERIES | 7.1 | 9.0 | 11.2 | 14.0 | 15.0 | 18.0 | 22.4 | 28.0 | 30.0 | 35.5 | 45.0 |
| THIRD STAGE | FIRST SERIES | 31.5 | 40.0 | 50.0 | 63.0 | 80.0 | 100 | 125 | 160 | 200 | 250 | 315 |
| | SECOND SERIES | 35.5 | 45.0 | 56.0 | 71.0 | 90.0 | 112 | 140 | 180 | 224 | 280 | |

(USE OF SECOND SERIES IS NOT RECOMENDED)

PRIOR ART

VARIABLE SPEED GEARED MOTOR AND A SERIES THEREOF

BACKGROUND OF THE INVENTION

1. Field of the Invention

The present invention relates to a variable speed geared motor constructed by combining an inverter motor controllable in rotational speed by inverter drive with a gear reducer.

2. Description of the Prior Art

A geared motor constructed by integrating a gear reducer with a motor is widely utilized as a power transmitting basic unit for driving every industrial and general machinery at an optimum rotational speed and torque.

Figure 4:
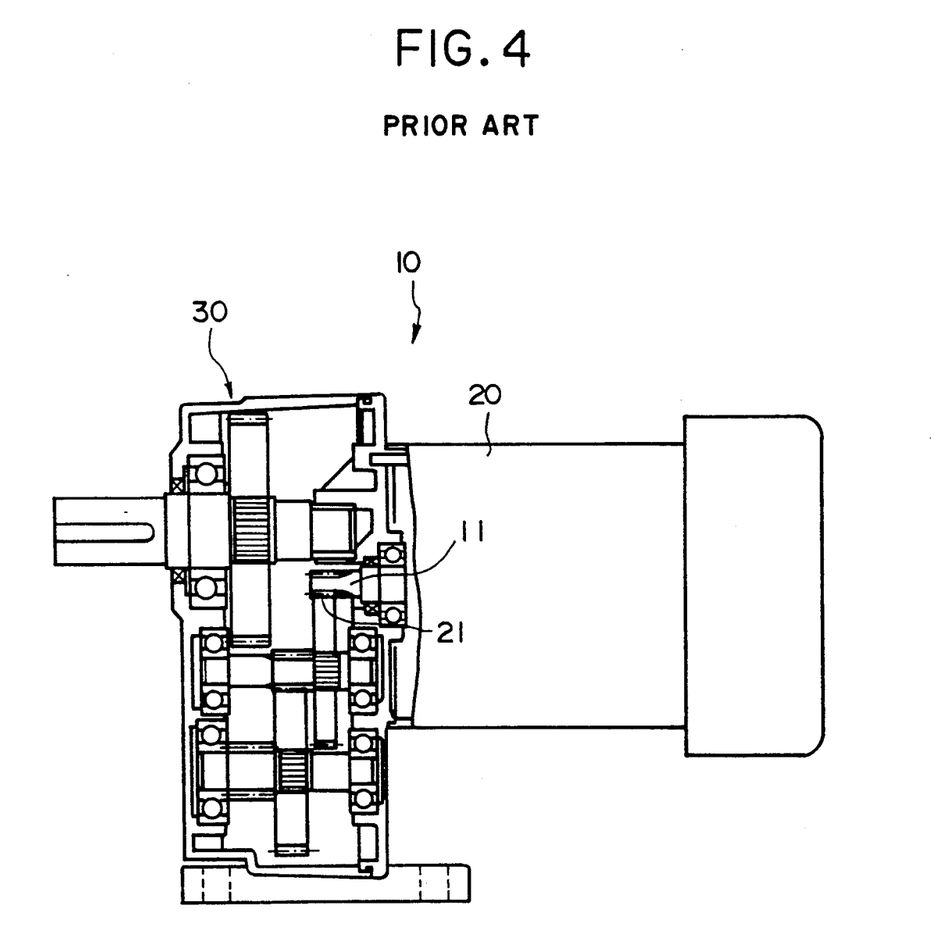
FIG. 4 is a developed sectional view showing a structure of a conventional geared motor.

FIG. 4 is a developed sectional view illustrating a structure of a geared motor 10 in the prior art. In FIG. 4, reference numeral 20 denotes a motor and reference numeral 30 denotes a gear reducer. An increase in output torque of the geared motor 10 can be attained by enlarging a reduction ratio i of the gear reducer 30 for the same motor 20.

Accordingly, as shown in FIG. 4, a general geared motor is adapted to accommodate a two-stage or three-stage gear train.

Further, in order to compactly accommodate the two-stage or three-stage gear train, a first-stage pinion 21 is formed by directly cutting a motor shaft 11 or press-fitted with the motor shaft 11.

Further, an attempt has been made to more compactly construct the geared motor by improving a bearing metal of an output shaft.

Figure 6:
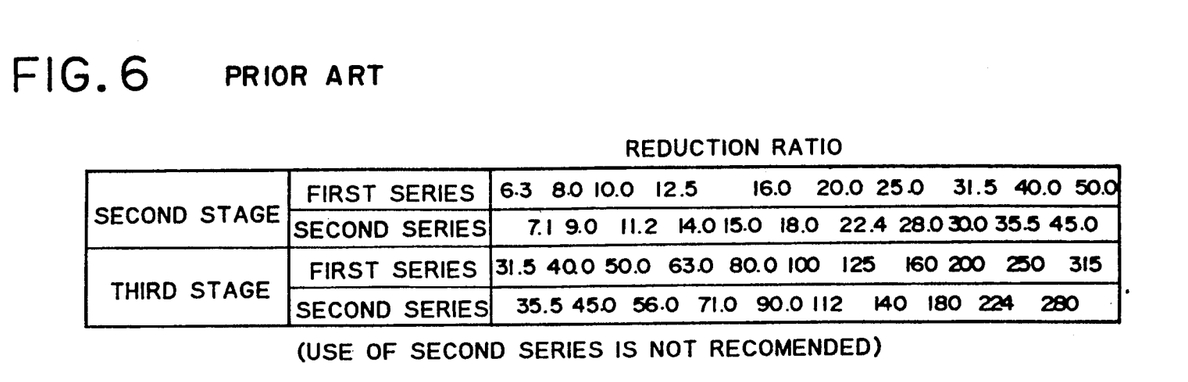
FIG. 6 is a tabular illustration showing a series of reduction ratios of two-stage type and three-stage type geared motors defined in accordance with the standard of JIGMA 212-01 by Japan Industrial Gear Manufacturers Association.

As shown in FIG. 6 according to the standard of JIGMA 212-01 by Japan Industrial Gear Manufactures Association, for example, it is known that reduction ratios of 6.3-50 are obtained in case of a two-stage gear train and reduction ratios of 31.5-315 are obtained in case of a three-stage gear train.

Figure 5:
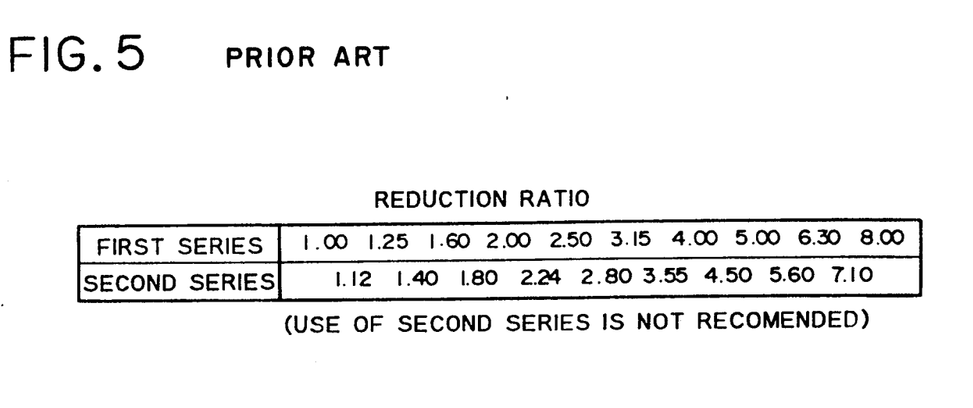
FIG. 5 is a tabular illustration showing a series of reduction ratios of a one-stage type geared motor defined in accordance with the standard of JIGMA 211-01 by Japan Industrial Gear Manufacturers Association.

On the other hand, a gear train providing reduction ratios of 8 and less has rarely been manufactured as a one-stage gear train in accordance with a series of reduction ratios by the standard of JIGMA 211-01 as shown in FIG. 5.

Meanwhile, a variable speed drive by a three-phase AC squirrel-cage motor of variable frequency inverter drive has been put into practical application through a development of electronic technology since the years of 1980. Further, a variable speed geared motor has also been put into practical application by combining the above motor with a gear reducer to obtain a large output torque at low speeds and a variable rotational speed.

In the inverter drive, the motor is driven at the frequencies 1/N–1/1 times a commercial frequency (50 Hz or 60 Hz) (e.g., at the frequencies 5 Hz–50 Hz in case of N=10 in an area where the commercial frequency is 50 Hz), thereby ensuring a speed change region of 1:N.

In such circumstances, it is general that the motor of inverter drive is not combined with a gear reducer having the variable reduction ratio of N or less.

Actually, there exceptionally exists a marketed article having a reduction ratio of 5 lower than the reduction ratio of 10.

There is considered to be primarily due to the following reasons.

(1) In an inverter motor, any arbitrary one of the reduction ratios of about 1–10 can be attained by the inverter motor itself. Accordingly, in the case of requiring the reduction ratios over 10, the combination of the inverter motor with a gear reducer becomes really significant.

(2) If a gear reducer having a reduction ratio of 8 or less (particularly less than 6.3) is conventionally manufactured, it will become a one-stage gear reducer.

As a result, a distance between a motor shaft and an output shaft becomes equal to a center distance of gears, so that the center of a variable speed geared motor becomes too high (or too low) and a general construction thereof cannot be made compact.

However, the variable speed geared motor having the reduction ratios set in accordance with the above conception does not always sufficiently meet a certain need at present.

For example, in the application to driving of a pump or a high-speed conveyor, a relatively high rotational speed region of 200–900 rpm is used as an ordinary controlled rotational region. However, in this rotational region, the variable speed geared motor mentioned above in the prior art is not economical enough to efficiently utilize an output of the inverter motor.

This is considered to be due to the following first reason. That is, since the output shaft (coupling) of the variable speed geared motor is designed on the basis of an output torque and a radial load, it is required to be adapted for "high reduction ratio" with a large output torque. As a result, a diameter of the output shaft becomes large, and it is therefore necessary to adopt a large coupling or the like. Accordingly, the variable speed geared motor causes "poor economy".

Figure 7:
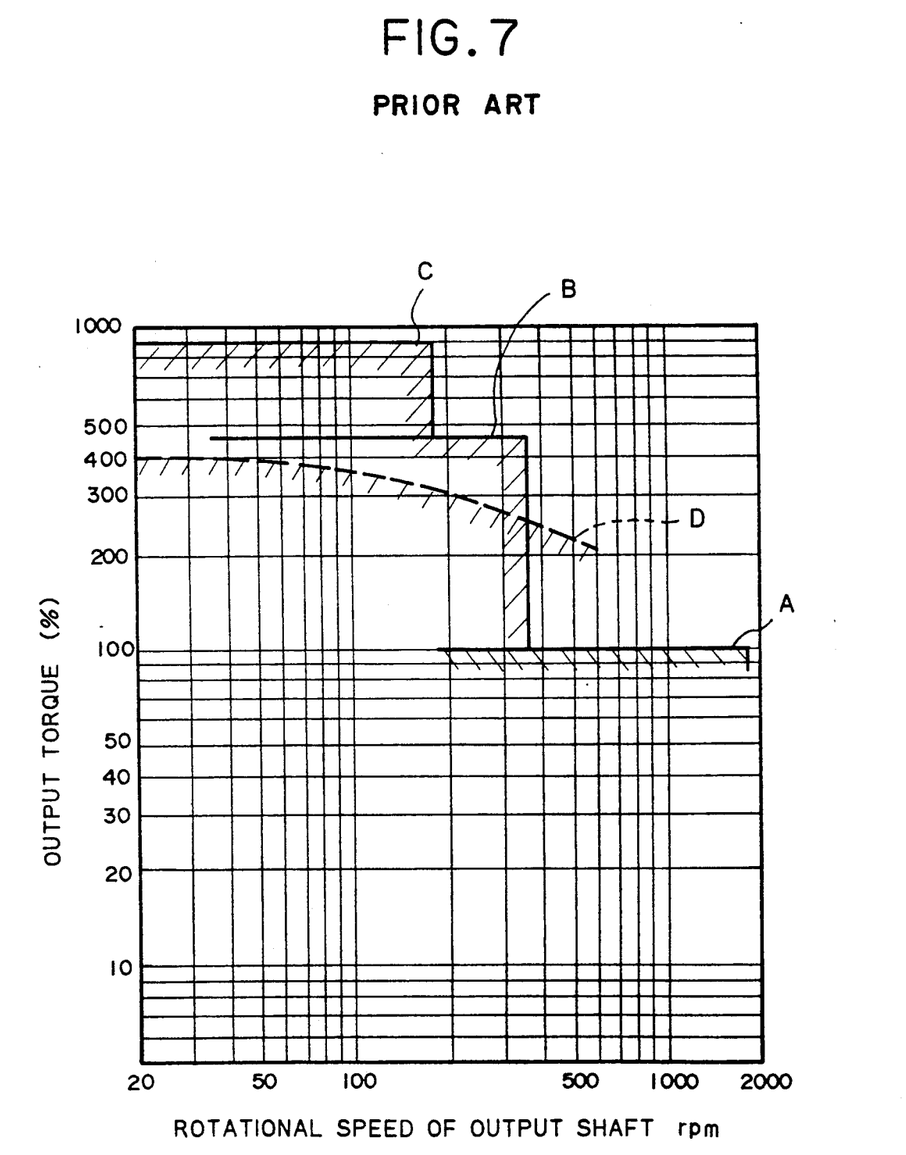
FIG. 7 is a graph similar to FIG. 2, showing an output torque characteristic of a conventional variable speed geared motor.

A second reason for the "poor economy" is considered to be as follows:

FIG. 7 is a graph showing the relation between a rotational speed of an output shaft of a conventional variable speed geared motor and an output torque thereof.

The output torque is shown with a rated torque of an inverter motor assumed to be 100%. In FIG. 7, reference character A denotes an output torque range of the inverter motor itself; B denotes an output torque range of the geared motor combined with a reduction ratio i=5; and C denotes an output torque range of the geared motor combined with a reduction ratio i=10. These output torque ranges are shown with an efficiency of a gear reducer assumed to be 90%.

Figure 8:
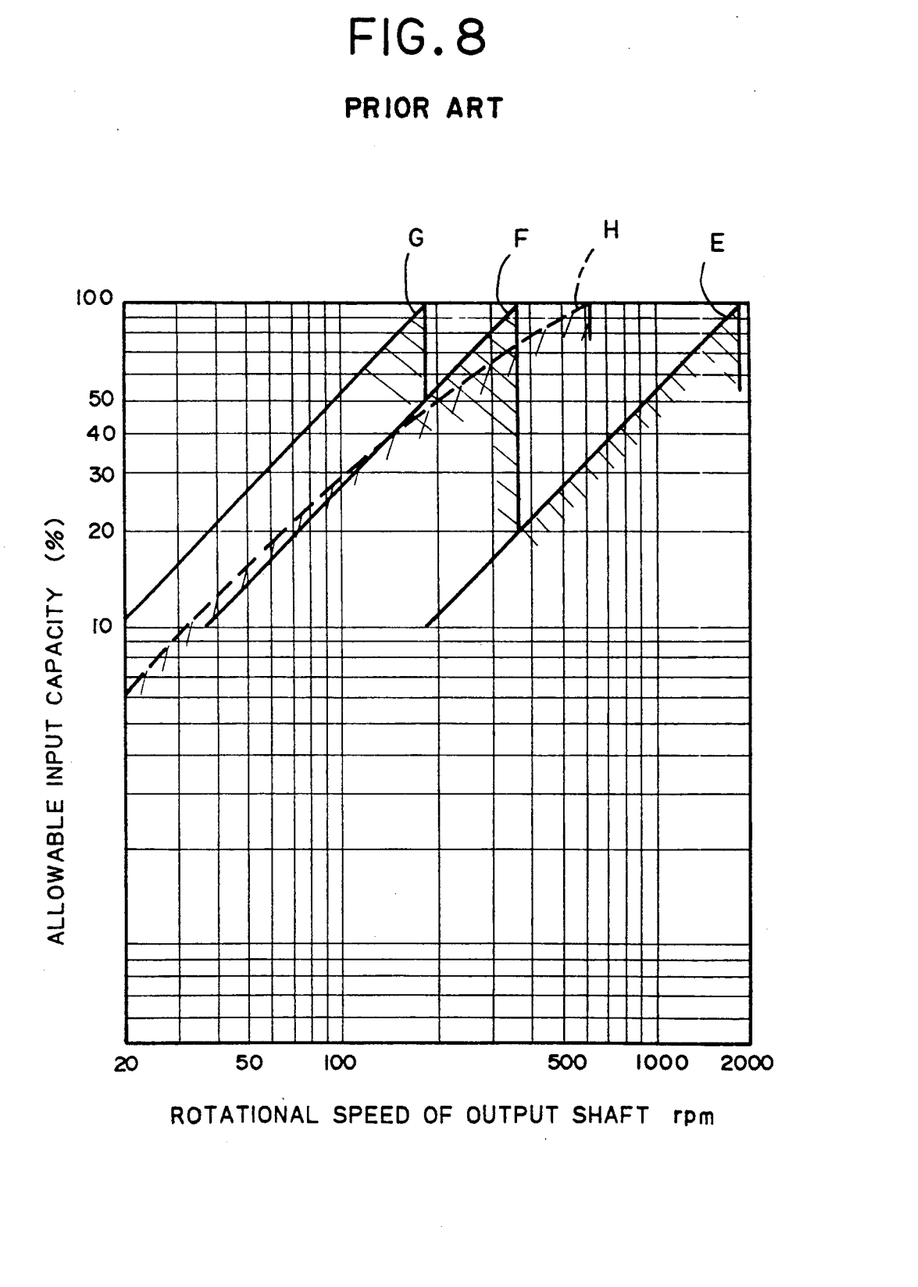
FIG. 8 is a graph similar to FIG. 3, showing an allowable input capacity characteristic of the conventional variable speed geared motor.

FIG. 8 is a graph showing the relation between a rotational speed of an output shaft of a conventional variable speed geared motor and an allowable input capacity thereof. The allowable input capacity is shown with a rated capacity (kW) of an inverter motor assumed to be 100%. In FIG. 8, reference character E denotes an allowable input capacity range of the inverter motor itself, G denotes an allowable input range of the geared motor combined with a reduction ratio i=5; and F denotes an allowable input capacity range of the geared motor combined with a reduction ratio i=10.

As apparent from FIG. 8, in a relatively high rotational speed region (e.g., rotational speeds higher than 360 rpm), the allowable input capacity of the conventional variable speed geared motor is very low with respect to the rated capacity of the inverter motor, and a capacity of the inverter motor itself cannot be sufficiently exhibited. Accordingly, a larger inverter motor (a single member) and an inverter are required in some application, thus causing the "poor economy".

In view of this circumstance, another driving method is disclosed in Japanese Patent Laid-open Publication No. 60-26849 such that a so-called mechanical transmission such as a frictional continuous transmission constructed by combining a lubricating oil traction with a differential planetary mechanism is used in a relatively high rotational speed region.

An output torque characteristic and an allowable input capacity characteristic of the mechanical transmission are shown by reference character D in FIG. 7 and reference character H in FIG. 8, respectively.

The combination of this mechanical transmission with a general-purpose squirrel-cage motor can provide an intermediate characteristic between a constant horsepower characteristic and a constant torque characteristic.

Accordingly, a large torque can be generated in a low rotational speed region. Thus, the mechanical transmission has a characteristic more advantageous than the variable speed geared motor in one aspect. However, since a speed changing operation itself of the transmission must be mechanically performed, a control device for remotely performing this operation of the transmission is additionally required. Accordingly, this driving method is not so suitable for a system using a pump or a high-speed conveyor which is required to collectively control many transmissions in one position.

SUMMARY OF THE INVENTION

It is accordingly an object of the present invention to provide a variable speed geared motor which can be constructed more lightly in weight, more compactly, and at lower costs.

Accordingly to one aspect of the present invention, there is provided in a variable speed geared motor constructed by combining an inverter motor controllable in rotational speed by inverter drive with a gear reducer; the improvement wherein the gear reducer is made to be a two-stage type, and a reduction ratio i of the gear reducer is suppressed so that $i \leq N$ holds where N stands for a maximum reduction ratio of the inverter motor at which a constant torque characteristic can be ensured.

The maximum reduction ratio N is set to preferably 10 or less.

According to another aspect of the present invention, there is provided a series of variable speed geared motors each having the above construction, wherein a common ratio R of a series of reduction ratios i of the variable speed geared motors is set to 1.2-1.5.

The series of reduction ratios i is set to preferably 2, 3, 4, 5, 6, and 8.

As described above, the reduction ratio i of the geared motor is intentionally suppressed to a range conventionally considered to be insignificant, that is, a range equal to or less than the maximum reduction ratio N (generally more than 10) of the inverter motor at which a constant torque characteristic can be ensured. Moreover, the gear reducer having such a small reduction ratio is constructed as a two-stage type rather than a one-stage type.

As a result, in an ordinary controlled rotational region for a pump or a high-speed conveyor, a reduction ratio to be fitted with this rotational region can be easily selected. Furthermore, since the gear reducer is made to be a two-stage type, the axis of the output shaft can be located near the axis of the motor shaft, thereby achieving a compact construction of the geared motor.

Further, since the reduction ratio is not a "high reduction ratio" as in the prior art, a diameter of the output shaft need not be made unduly large. As a result, a coupling or the like can be made compact, light, and at low costs.

According to the present invention, there is further provided a series of such variable speed geared motors (i.e., each geared motor has a reduction ratio i equal to or less than the maximum reduction ratio N of the inverter motor), wherein a common ratio R of a series of reduction ratios i of the geared motors is set to 1.2-1.5. Accordingly, as will be described later, an allowable input capacity of the variable speed geared motor can be selected to become 67% or more of a rated capacity of the inverter motor in every rotational speed region of the output shaft. Thus, the variable speed geared motor can be used very economically.

BRIEF DESCRIPTION OF THE DRAWINGS

The above and other objects, features and advantages of the present invention will become more apparent from the following description of the invention taken in conjunction with the accompanying drawings, wherein like reference characters designate the same or similar parts, and wherein.

DETAILED DESCRIPTION OF THE PREFERRED EMBODIMENT

There will now be described a preferred embodiment of the present invention with reference to the drawings.

Figure 1:
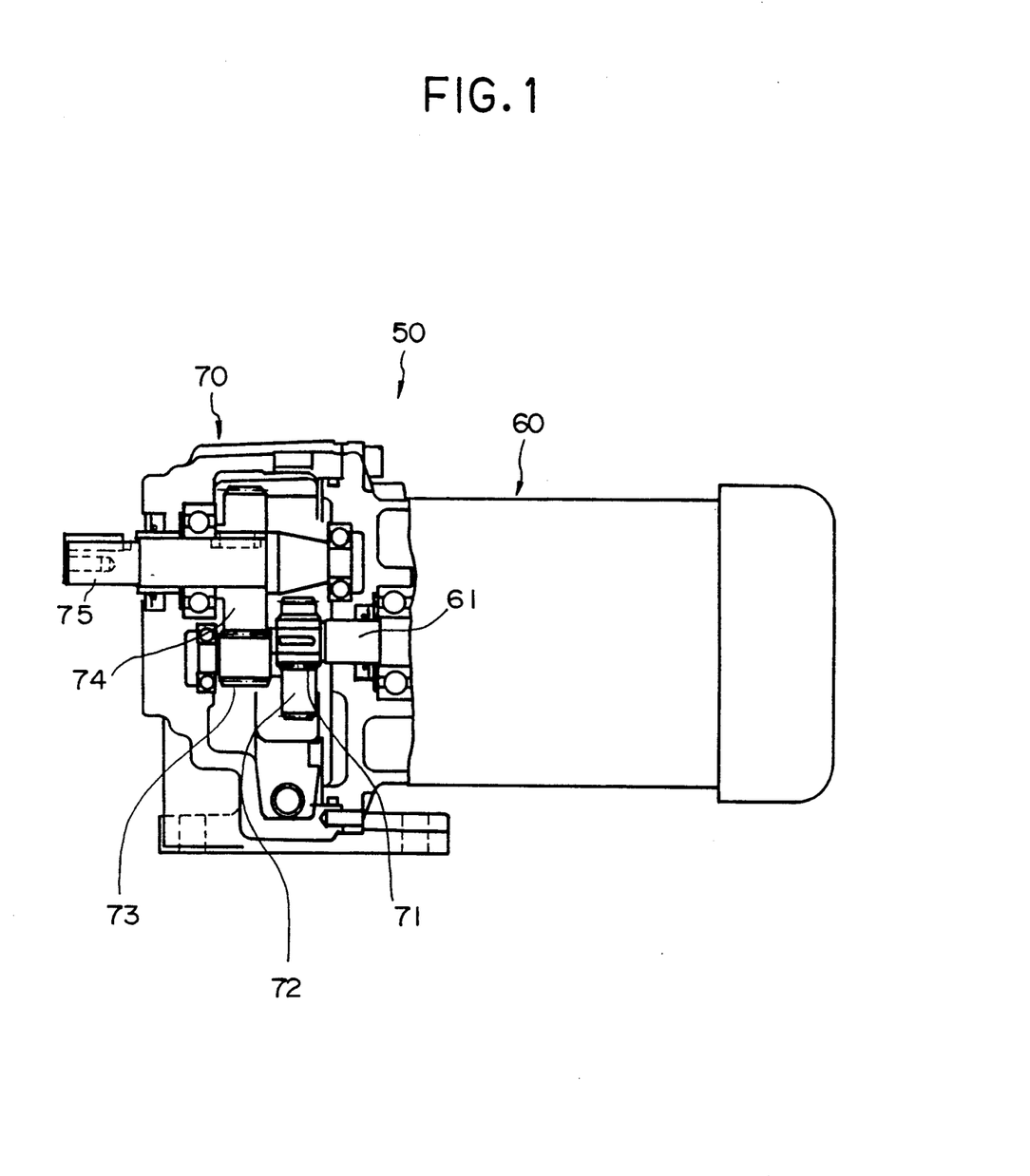
FIG. 1 is a schematic elevational view, partially cut away, of a variable speed geared motor according to a preferred embodiment of the present invention.

FIG. 1 is a sectional view illustrating an internal structure of a variable speed geared motor 50 according to the preferred embodiment of the present invention.

Referring to FIG. 1, the variable speed geared motor 50 is constructed by combining an inverter motor 60 controllable in rotational speed by inverter drive with a gear reducer 70.

The inverter motor 60 has a known construction such that a constant torque characteristic is ensured at reduction ratios of 1-10 (N=10).

The gear reducer 70 is of a two-stage type such that a first pinion 71 is press-fitted with a motor shaft 61, and a first gear 72 is meshed with the first pinion 71 to perform first-stage speed reduction, while a second pinion 73 is mounted on a shaft of the first gear 72, and a second gear 74 is meshed with the second pinion 73 to perform second-stage speed reduction. Thus, rotation of the motor shaft 61 is reduced in speed two-stepwise by the two-stage gear train and is transmitted to an output shaft 75.

Figure 2:
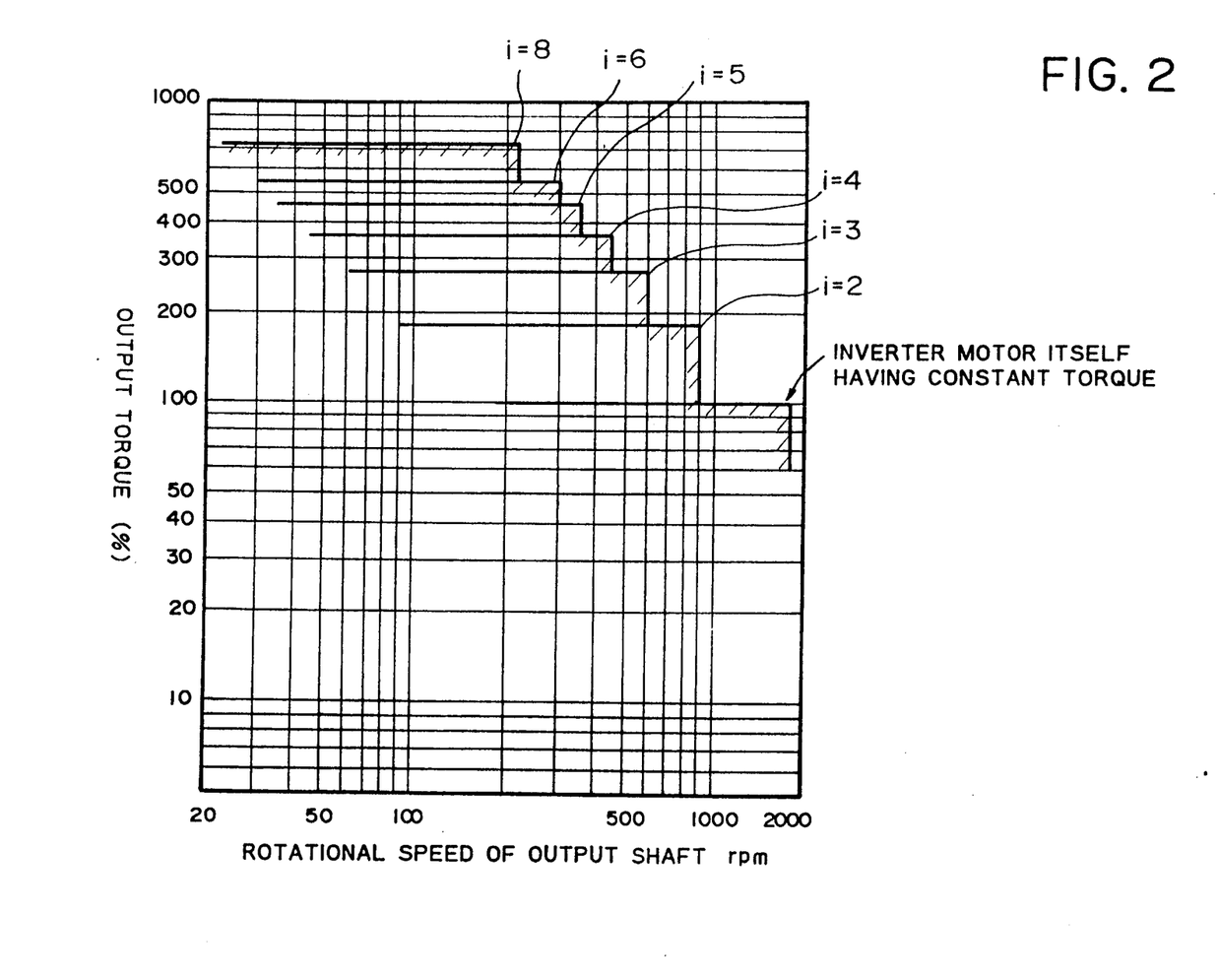
FIG. 2 is a graph showing a relation between a rotational speed of an output shaft of the variable speed geared motor shown in FIG. 1 and an output torque thereof with a reduction ratio changed as a parameter.

FIG. 2 is a graph showing the relation between a rotational speed of the output shaft 75 of the variable speed geared motor 50 and an output torque thereof with a reduction ration i changed as a parameter.

Figure 3:
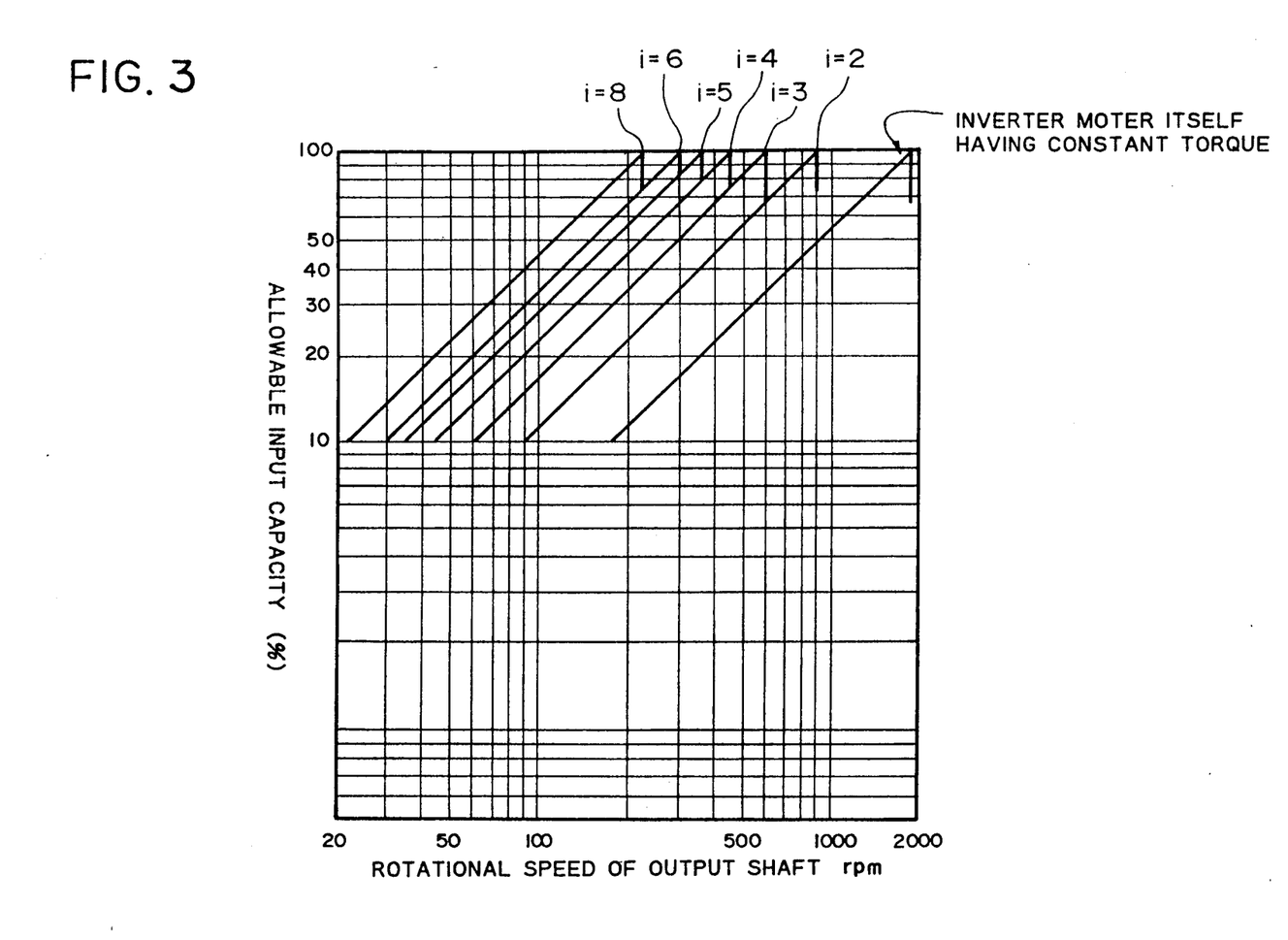
FIG. 3 is a graph showing a relation between a rotational speed of an output shaft of the variable speed geared motor shown in FIG. 1 and an allowable input capacity thereof with a reduction ratio changed as a parameter.

FIG. 3 is a graph showing the relation between a rotational speed of the output shaft 75 of the variable speed geared motor 50 and an allowable input capacity thereof with a reduction ratio i changed as a parameter.

In the present invention, the conventional ordinary conception such that a large torque is to be obtained by accommodating a gear reducer having a possible large reduction ratio in a given gear box has been drastically reconsidered. Thus, according to the preferred embodiment, a maximum one of reduction ratios i (series) to be prepared for the gear reducer 70 is suppressed to 1:8 which is less than 1:10 as a maximum reduction ratio N of the inverter motor 60 itself. Furthermore, the gear train of the gear reducer 70 is constructed as a two-stage type regardless of such a small reduction ratio, so that the axis of the motor shaft 61 of the inverter motor 60 can be located near the axis of the output shaft 75 of the variable speed geared motor 50, thereby achieving a compact construction of the variable speed geared motor 50.

The series of reduction ratios i of the gear reducer 70 is previously set to 2, 3, 4, 5, 6, and 8. As to this series of reduction ratios i, a ratio between 2 and 3 is 1.50, a ratio between 3 and 4 is 1.33, a ratio between 4 and 5 is 1.25, a ratio between 5 and 6 is 1.20, and a ratio between 6 and 8 is 1.33. As apparent from these values, a common ratio R of the series of reduction ratios i is set to 1.2-1.5.

Further, a diameter of the output shaft 75 of the variable speed geared motor 50 is so sized as to be fitted with an output torque in the case of the maximum reduction ratio $1=8$, thereby achieving light-weight and compact design of the coupling.

In comparing the characteristic shown in FIG. 2 according to the preferred embodiment with the characteristic shown in FIG. 7 in the prior art, and further comparing the characteristic shown in FIG. 3 according to the preferred embodiment with the characteristic shown in FIG. 8 in the prior art, it is understood that the preferred embodiment is advantageous in the following points.

At previously mentioned, the conventional inverter motor can obtain by itself an arbitrary one of reduction ratios up to the maximum reduction ratio N, with the result that there is basically no conception in the prior art such that the inverter motor is to be combined with a gear reducer having a low reduction ratio.

Particularly in case of directly connecting the inverter motor to a gear reducer, it is generally intended to obtain a "high reduction ratio". As a result, there exceptionally exists a reduction ratio of 5 only under the reduction ratio of 10 as previously mentioned. Accordingly, in the case that a maximum output rotational speed of the inverter motor is 1800 rpm, for example, the inverter motor as a single member (not combined with a gear reducer) must be selected in a rotational speed region higher than 360 rpm.

However, as apparent from FIG. 8, the allowable input capacity of the inverter motor itself at 360 rpm is about 20% of the rated capacity of the inverter motor. That is, a capacity of the inverter motor itself cannot be sufficiently exhibited in this region. Accordingly, in some application, a large inverter motor (as a single member) must be selected.

To the contrary, according to the preferred embodiment, the maximum reduction ratio i of the gear reducer 70 is suppressed to 8 which is lower than the maximum reduction ratio N (N=10 in this preferred embodiment) of the inverter motor 60 at which a constant torque characteristic can be ensured. Furthermore, a common ratio R of a series of reduction ratios i=2, 3, 4, 5, 6, and 8 is set to 1.2-1.5.

Therefore, the variable speed geared motor can be selected so as to always ensure an allowable input capacity of 67% or more of the rated capacity of the inverter motor 60 in a rotational speed region 1/N to ½ times a synchronous rotational speed of the inverter motor 60.

As a result, the capacity of the inverter motor 60 to be used can be sufficiently utilized, so that even when the inverter motor 60 is smaller by one or two ranks than the prior art inverter motor, an intended object can be similarly attained.

Further, according to the preferred embodiment, since the gear reducer having a low reduction ratio is of a two-stage type, the axis of the motor shaft 61 of the inverter motor 60 can be located near the axis of the output shaft 75 of the variable speed geared motor 50, thereby constructing the geared motor more compactly.

Although it has been described that the allowable input capacity of 67% or more of the rated capacity of the inverter motor 60 can be ensured since the maximum value of the common ratio R is set to 1.5, it will be apparent that a larger value of the allowable input capacity can be ensured by more finely defining the common ratio R.

While the invention has been described with reference to a specific embodiment, the description is illustrative and is not to be construed as limiting the scope of the invention. Various modifications and changes may occur to those skilled in the art without departing from the spirit and scope of the invention as defined by the appended claims.

What is claimed is:

1. A variable speed geared motor comprising an inverter motor controllable in rotational speed by inverter drive, and a gear reducer combined therewith, wherein:

said reduction ratio i of said gear reducer is suppressed so that i≦N holds where N is a maximum reduction ratio of said inverter motor at which a constant torque characteristic is ensured.

2. The variable speed geared motor as defined in claim 1, wherein N is 10 or less.

* * * * *